(12) United States Patent
Watanabe et al.

(10) Patent No.: US 11,088,991 B2
(45) Date of Patent: Aug. 10, 2021

(54) FIREWALL DEVICE TO AUTOMATICALLY SELECT A RULE REQUIRED FOR EACH INDIVIDUAL WEB SERVER

(71) Applicant: Cyber Security Cloud, Inc., Tokyo (JP)

(72) Inventors: Yoji Watanabe, Tokyo (JP); Yusuke Sasaki, Tokyo (JP)

(73) Assignee: CYBER SECURITY CLOUD, INC., Tokyo (JP)

( * ) Notice: Subject to any disclaimer, the term of this patent is extended or adjusted under 35 U.S.C. 154(b) by 328 days.

(21) Appl. No.: 16/205,824

(22) Filed: Nov. 30, 2018

(65) Prior Publication Data

US 2019/0173844 A1    Jun. 6, 2019

(30) Foreign Application Priority Data

Dec. 5, 2017  (JP) .............................. JP2017-233687

(51) Int. Cl.
H04L 29/06         (2006.01)

(52) U.S. Cl.
CPC ...... H04L 63/0263 (2013.01); H04L 63/0236 (2013.01)

(58) Field of Classification Search
CPC .................. H04L 63/0263; H04L 63/0236
See application file for complete search history.

(56) References Cited

U.S. PATENT DOCUMENTS

| | | | | |
|---|---|---|---|---|
| 7,861,247 B1 * | 12/2010 | Santos | .................. | G06F 9/5011 718/104 |
| 9,686,173 B1 * | 6/2017 | Giordano | ............ | H04L 43/0864 |
| 9,853,993 B1 * | 12/2017 | Zhou | ..................... | H04L 63/205 |
| 10,755,280 B2 * | 8/2020 | Bedi | ................... | G06Q 20/4016 |
| 10,965,691 B1 * | 3/2021 | Maxwell | ............... | H04L 63/126 |
| 2005/0228852 A1 * | 10/2005 | Santos | ................... | G06F 9/5005 709/200 |
| 2007/0282985 A1 * | 12/2007 | Childress | .............. | G06F 9/5061 709/223 |
| 2008/0098453 A1 * | 4/2008 | Hinton | .................... | H04L 63/20 726/1 |

(Continued)

FOREIGN PATENT DOCUMENTS

| | | |
|---|---|---|
| JP | 2013-011949 A | 1/2013 |
| JP | 2015-050717 A | 3/2015 |

OTHER PUBLICATIONS

NPL Search (Google Scholar) (Year: 2021).*

(Continued)

*Primary Examiner* — Mahfuzur Rahman
*Assistant Examiner* — Richard W Cruz-Franqui
(74) *Attorney, Agent, or Firm* — Greenblum & Bernstein, P.L.C.

(57) ABSTRACT

A firewall device comprises a storage unit that stores therein one or more rules related to blocking a request for each of a plurality of WEB servers independently of the rule for another WEB server; a feature-amount calculating unit that calculates a feature amount for each of the WEB servers based on a number of detections with regard to each index in each of the WEB servers; and a rule updating unit that updates a rule stored in the storage unit for each of the WEB servers based on the feature amount calculated by the feature-amount calculating unit.

6 Claims, 15 Drawing Sheets

(56) References Cited

U.S. PATENT DOCUMENTS

| | | | | |
|---|---|---|---|---|
| 2008/0148382 | A1* | 6/2008 | Bartholomy | H04L 12/66 |
| | | | | 726/11 |
| 2008/0168560 | A1* | 7/2008 | Durie | H04L 63/1425 |
| | | | | 726/23 |
| 2014/0315517 | A1* | 10/2014 | Cohan | H04W 12/08 |
| | | | | 455/410 |
| 2015/0033285 | A1* | 1/2015 | Gao | H04L 63/0263 |
| | | | | 726/1 |
| 2015/0237015 | A1* | 8/2015 | Bansal | H04L 63/20 |
| | | | | 726/13 |
| 2016/0191466 | A1* | 6/2016 | Pernicha | H04L 63/20 |
| | | | | 726/1 |
| 2016/0380840 | A1* | 12/2016 | Karve | H04L 67/06 |
| | | | | 709/223 |
| 2017/0063794 | A1* | 3/2017 | Jain | G06F 16/9024 |
| 2018/0150361 | A1* | 5/2018 | Khandelwal | G06F 16/24534 |
| 2018/0324219 | A1* | 11/2018 | Xie | H04L 63/1433 |
| 2019/0173844 | A1* | 6/2019 | Watanabe | H04L 63/0263 |

OTHER PUBLICATIONS

"AWS WAF and AWS Shield Advanced Developer Guide, API Version Aug. 24, 2015", Amazon Web Services, Inc., pp. 6-11, 122-135, published Jul. 25, 2016.

Office Action issued in Japanese family member Patent Appl. No. 2017-233687, dated Feb. 27, 2018.

Search Report issued in European Patent Office (EPO) Patent Application No. 18208818.7, dated Apr. 11, 2019.

* cited by examiner

| WEB SERVER ID | RULE ID | NUMBER OF DETECTIONS |
|---|---|---|
| host000039 | 31515 | 66 |
| | 31104 | 51 |
| | 31516 | 31 |
| | 31508 | 24 |
| | 200024 | 13 |
| | 200022 | 9 |
| | 31164 | 6 |
| | 31106 | 5 |
| | 31151 | 1 |
| host000041 | 31151 | 71 |
| | 31515 | 69 |
| | 31508 | 17 |
| | 31516 | 8 |
| | 200002 | 1 |
| host000042 | 31508 | 106 |
| | 200024 | 93 |
| | ⋮ | ⋮ |
| ⋮ | ⋮ | ⋮ |

FIG.7

| RULE ID | NUMBER OF DETECTIONS | RATIO (%) | FEATURE AMOUNT (=1-RATIO) |
|---|---|---|---|
| 31515 | 66 | 32.0388349514563 | 0.679611650485436 |
| 31104 | 51 | 24.757281553398 | 0.752427184466019 |
| 31516 | 31 | 15.0485436893203 | 0.849514563106796 |
| 31508 | 24 | 11.6504854368932 | 0.883495145631068 |
| 200024 | 13 | 6.31067961165048 | 0.936893203883495 |
| 200022 | 9 | 4.36893203883495 | 0.95631067961165 |
| 31164 | 6 | 2.91262135922330 | 0.970873786407767 |
| 31106 | 5 | 2.42718446601941 | 0.975728155339805 |
| 31151 | 1 | 0.485436893203883 | 0.995145631067961 | host000039

FIG.8A

| RULE ID | NUMBER OF DETECTIONS | RATIO (%) | FEATURE AMOUNT (=1-RATIO) |
|---|---|---|---|
| 31151 | 71 | 42.7710843373493 | 0.572289156626506 |
| 31515 | 69 | 41.5662650602409 | 0.58433734939759 |
| 31508 | 17 | 10.2409638554216 | 0.897590361445783 |
| 31516 | 8 | 4.81927710843373 | 0.951807228915662 |
| 200002 | 1 | 0.602409638554216 | 0.993975903614457 | host000041

FIG.8B

| WEB SERVER ID | RULE ID | | | | | | |
|---|---|---|---|---|---|---|---|
| | 31103 | 31104 | 31105 | 31106 | 31110 | 31151 | ... |
| host000039 | 0 | 0.752427184 | 0 | 0.975728155 | 0 | 0.995145631 | |
| host000041 | 0 | 0 | 0 | 0 | 0 | 0.572289157 | |
| host000042 | 0.801699717 | 0.991501416 | 0 | 0 | 0 | 0.991501416 | |
| host000046 | 0 | 0 | 0 | 0.774509804 | 0 | 0.990196078 | |
| host000047 | 0 | 0 | 0 | 0.886310905 | 0 | 0.983758701 | |
| host000049 | 0.969696970 | 0.575757576 | 0 | 0 | 0 | 0.909090909 | |
| host000050 | 0 | 0.909090909 | 0.818181818 | 0 | 0 | 0.818181818 | |
| host000051 | 0 | 0 | 0 | 0 | 0 | 0 | |
| host000062 | 0.965963061 | 0 | 0 | 0.999736148 | 0 | 0.996174142 | |
| host000078 | 0 | 0.647058824 | 0 | 0 | 0 | 0 | |
| host000085 | 0 | 0 | 0 | 0 | 0 | 0.635220126 | |
| host000089 | 0 | 0 | 0 | 0 | 0 | 0.990384615 | |
| host000094 | 0 | 0 | 0 | 0 | 0 | 0.161879896 | |
| host000095 | 0.5 | 0 | 0 | 0 | 0 | 0 | |
| host000096 | 0 | 0 | 0 | 0.996108949 | 0 | 0.931906615 | |
| host000115 | 0 | 0.916184971 | 0 | 0.577071291 | 0 | 0.941233141 | |
| ... | | | | ... | | | |

FIG.9

| WEB SERVER ID | RULE ID | | | |
|---|---|---|---|---|
| | 31151 | 31508 | 31515 | 31516 |
| host000039 | 0.9951 | 0.8834 | 0.6796 | 0.8495 |
| host000041 | 0.5722 | 0.8975 | 0.5843 | 0.9518 |

FIG.10A

| RULE ID | EUCLIDEAN DISTANCE |
|---|---|
| 31151 | 0.1788 |
| 31508 | 0.0002 |
| 31515 | 0.0091 |
| 31516 | 0.0105 |

FIG.10B

| TOTAL VALUE OF EUCLIDEAN DISTANCES | 0.1986 |
|---|---|
| USER SIMILARITY | 0.6917 |

FIG.10C

| WEB SERVER ID | SIMILARITY | UNREGISTERED RULE FOR host000039 |
|---|---|---|
| host000042 | 0.6917 | 31103, 31510, 31511, 31533, 200002 |
| host000049 | 0.7764 | 31103, 31153, 31533 |

FIG.11A

| | WEB SERVER ID | |
|---|---|---|
| RULE ID | host000042 | host000049 |
| 31103 | 0.8017 | 0.9697 |
| 31153 | 0 | 0.9696 |
| 31510 | 0.9830 | 0 |
| 31511 | 0.8810 | 0 |
| 31533 | 0.9971 | 0.9696 |
| 200002 | 0.9886 | 0 |

FIG.11B

| RULE ID | WEIGHTED AVERAGE (RECOMMENDATION SCORE) |
|---|---|
| 31103 | 0.8905 |
| 31153 | 0.9696 |
| 31510 | 0.9829 |
| 31511 | 0.8810 |
| 31533 | 0.9826 |
| 200002 | 0.9886 |

FIG.11C

```
{
    ".php"       : 878,
    "logic"      : 222,
    ".css"       : 86,
    ".js"        : 165,
    ".gif"       : 320,  ⎫
    ".jpg"       : 597,  ⎬ ~ A1
    ".png"       : 53,   ⎭
    ".txt"       : 10,
    ".html"      : 2,
    "wordpress"  : 10,   ⎫
    "wp-cron"    : 2,    ⎬ ~ A2
    "wp-content" : 3,    ⎭
    "GET"        : 3189,
    "POST"       : 3
}
```

FIG.12A

```
{
    "image"     : 970,
    "wordpress" : 15,
    ".php"      : 878,
    "logic"     : 222,
    ".css"      : 86,
    ".js"       : 165,
    ".txt"      : 10,
    ".html"     : 2,
    "GET"       : 3189,
    "POST"      : 3
}
```

FIG.12B

```
{
    "image"     : 0.41311755,
    "wordpress" : 0.000638842,
    ".php"      : 0.37393526,
    "logic"     : 0.09454855,   ⎫
    ".css"      : 0.03662692,   ⎬ ~ B1
    ".js"       : 0.07027257,   ⎪
    ".txt"      : 0.000425894,  ⎪
    ".html"     : 0.00085179,   ⎭
    "GET"       : 0.99906015,   ⎫ ~ B2
    "POST"      : 0.00093985    ⎭
}
```

FIG.12C

| WEB SERVER ID | REQUEST TYPE ||||||
|---|---|---|---|---|---|---|
| | image | wordpress | js | .html | .php | GET | POST |
| host000039 | 0.017981958 | 0.000042918 | 0.009671038 | 0.00029941 | 0.417918806 | 0.17459117 | 0.82540883 |
| host000041 | 0.707129046 | 0 | 0.069532682 | 0.083142907 | 0.035908897 | 0.99282844 | 0.00717156 |
| host000042 | 0.381943243 | 0.026826433 | 0.033802669 | 0.00034785 | 0.038634119 | 0.99714751 | 0.00285249 |
| host000046 | 0 | 0 | 0 | 0 | 0 | 0.91764706 | 0.08235294 |
| host000047 | 0.38125 | 0 | 0.0125 | 0 | 0.0125 | 0.91390728 | 0.08609272 |
| host000049 | 0.250891795 | 0 | 0.054469679 | 0 | 0.275267539 | 0.60879905 | 0.39120095 |
| host000050 | 0.275139665 | 0 | 0.055865922 | 0 | 0.284916201 | 0.6075419 | 0.3924581 |
| host000051 | 0.03555207 | 0 | 0.007003671 | 0.002396279 | 0.9015456 | 0.99877644 | 0.00122356 |
| host000062 | 0.177142857 | 0 | 0.045714286 | 0.022857143 | 0 | 1 | 0 |
| host000078 | 0.009676652 | 0 | 0.020044569 | 0 | 0 | 0.3378127 | 0.6621873 |
| host000094 | 0.430904409 | 0.000139861 | 0.079062765 | 0.017095986 | 0.11482612 | 0.86941052 | 0.13058948 |
| host000095 | 0.153807107 | 0 | 0.084263959 | 0.003553299 | 0 | 0.87201625 | 0.12798375 |
| host000096 | 0.660376124 | 0.102681299 | 0.08387512 | 0.019635221 | 0.003272537 | 0.99753848 | 0.00246152 |
| host000103 | 0.0031545744 | 0 | 0 | 0 | 0 | 0.09148265 | 0.90851735 |
| host000114 | 0.103288115 | 0 | 0.044242074 | 0.001321783 | 0.336476239 | 0.66402721 | 0.33597279 |
| host000121 | 0.3775120336 | 0 | 0.194833073 | 0.118373909 | 0.000855583 | 0.9981596 | 0.0018404 |
| ... | | | | | | | |

FIG.13

| GROUP | WEB SERVER ID |
|---|---|
| G0 | host000036 |
| | host000038 |
| | host000041 |
| | host000042 |
| | host000046 |
| | ⋮ |
| G1 | host000062 |
| | host000123 |
| | host000158 |
| | host000199 |
| | host000239 |
| | ⋮ |
| G2 | host000122 |
| | host000140 |
| | host000211 |
| | host000524 |
| | host001179 |
| | ⋮ |
| ⋮ | ⋮ |

FIG.14

FIREWALL DEVICE TO AUTOMATICALLY SELECT A RULE REQUIRED FOR EACH INDIVIDUAL WEB SERVER

BACKGROUND OF THE INVENTION

Field of the Invention

The present invention relates to a firewall device, and more particularly relates to a firewall device that prevents an unauthorized access from an external network by managing transmission and reception at an application level.

Description of Related Art

A web application firewall (hereinafter, "WAF") is a firewall system that prevents an unauthorized access from an external network by managing transmission and reception at an application level. "AWS WAF" ([online], Amazon dot com incorporated, [searched on 23 Oct. 2017], Internet URL:https://aws.amazon.com/jp/waf/) is known as a typical WAF service. In this technique, a front-end server is provided between a WEB server and the Internet, and a WAF server that is configured to be communicable with the front-end server is further provided. Upon reception of a request to the WEB server, the front-end server once transfers the request to the WAF server. The WAF server has a rule for distinguishing a request to be blocked and a request to be permitted from each other (specifically, a signature in which requests to be blocked are listed), and applies this rule to the transferred request to determine whether to block or permit the transferred request. When it is determined that the transferred request is to be blocked, the front-end server discards the request without transferring it to the WEB server. On the other hand, when it is determined that the transferred request is to be permitted, the front-end server transfers it to the WEB server.

Japanese Patent Application Laid-open No. 2015-50717 discloses a computer system using a WAF. The technique described in Japanese Patent Application Laid-open No. 2015-50717 incorporates a firewall including a WAF into a network only when an unauthorized access is detected, thereby reducing the cost of the firewall. However, this technique requires an unauthorized-access detecting device for detecting an unauthorized access separately from the firewall. The unauthorized-access detecting device is configured to detect an unauthorized access by matching an access with a signature registered in advance similarly to the WAF.

In the WAF server described above, a storage area is provided for each WEB server, and a rule is held in the storage area. Therefore, the rule is held for each WEB server. This is because the contents of a request to be blocked or permitted can be different among the WEB servers.

The rule corresponding to each WEB server has to be set in the WAF server by a manager of the WEB server. However, this method has a problem of difficulty in quickly dealing with a new type of attack. To solve this problem, there is conceived a method in which a new rule is automatically and unconditionally added to a server of its own every time the new rule is disclosed by a computer security company. However, in this case, there arises another problem that the size of rules becomes very large and it occupies much of the storage area in the WAF server.

Japanese Patent Application Laid-open No. 2015-50717 also has a similar problem regarding signatures that are registered in an unauthorized-access detecting device in advance.

Therefore, an object of the present invention is to provide a firewall device that automatically selects a rule required for each individual WEB server so as to be capable of quickly dealing with a new type of attack without making the size of rules very large.

SUMMARY

In one embodiment, there is provided a firewall device comprises a storage unit that stores therein one or more rules related to blocking a request for each of a plurality of WEB servers independently of the rule for another WEB server; a feature-amount calculating unit that calculates a feature amount for each of the WEB servers based on a number of detections with regard to each index in each of the WEB servers; and a rule updating unit that updates a rule stored in the storage unit for each of the WEB servers based on the feature amount calculated by the feature-amount calculating unit.

According to the present invention, it is possible to automatically select a rule required for each individual WEB server based on the number of detections with regard to each index in a plurality of WEB servers. Therefore, it is possible to quickly deal with a new type of attack without making the size of rules very large.

BRIEF DESCRIPTION OF THE DRAWINGS

The above features and advantages of the present invention will be more apparent from the following description of certain preferred embodiments taken in conjunction with the accompanying drawings, in which:

FIG. 7 is a diagram illustrating an example of the number of detections that is acquired when the index is a rule;

FIGS. 8A and 8B illustrate a calculation example of a feature amount in a case where the index is a rule;

FIG. 9 is a diagram illustrating a feature-amount matrix created by using a rule as an index;

FIG. 10A is a diagram illustrating rules each co-occurring between two WEB servers 3 whose WEB server ID are host000039 and host000041;

FIG. 10B is a diagram illustrating a Euclidean distance with regard to each rule calculated in the example illustrated in FIG. 10A;

FIG. 10C is a diagram illustrating a total value of Euclidean distances and a user similarity calculated in the example illustrated in FIG. 10A;

FIG. 11A is a diagram illustrating one or more rules that are not registered for a WEB server 3 whose WEB server ID is host000039 but are registered for another WEB server 3;

FIG. 11B is a diagram illustrating a feature amount for each WEB server 3 illustrated in FIG. 11A;

FIG. 11C is a diagram illustrating a recommendation score calculated with regard to each rule ID illustrated in FIG. 11B;

FIGS. 12A and 12B are diagrams illustrating an example of the number of detections acquired in the case where the index is a request type;

FIG. 12C is a diagram illustrating a calculation example of a feature amount in a case where the index is a request type;

FIG. 13 is a diagram illustrating an example of a feature-amount matrix created by using a request type as an index;

FIG. 14 is a diagram illustrating an example of grouping of a plurality of WEB servers 3 by clustering.

DETAILED DESCRIPTIONS

Embodiments of the present invention will be described below in detail with reference to the accompanying drawings.

Figure 1A:
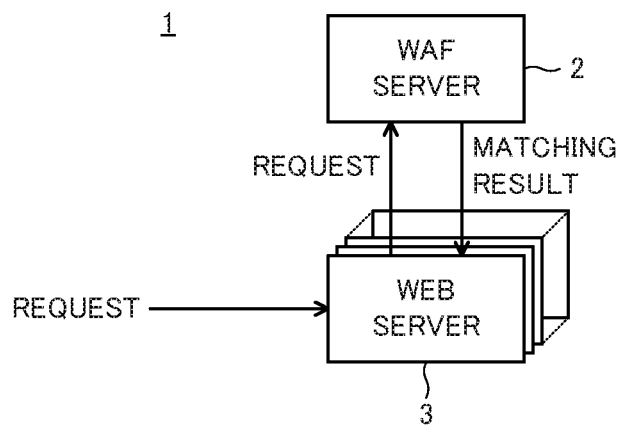
FIG. 1A is a diagram illustrating a system configuration of a firewall system 1 according to an embodiment of the present invention.

FIG. 1A is a diagram illustrating a system configuration of a firewall system 1 according to an embodiment of the present invention. As illustrated in FIG. 1A, the firewall system 1 includes one WAF server 2 and a plurality of WEB servers 3.

The WEB server 3 is a computer that receives a request from a client (not illustrated) in accordance with a hypertext transfer protocol (HTTP) via the Internet, for example, and provides services corresponding to the contents of the request to the client. For example, in a case where the request is to transfer specific information (GET), when the requested information is a file (for example, an image file, an HTML file, or a text file), the WEB server 3 transfers the contents of the file to the client. When the requested information is an execution result of a program such as, e.g., PHP® or JavaScript®, the WEB server 3 executes the program and transfers information obtained as the execution result to the client. In a case where the request is data processing (POST), the WEB server 3 performs processing in accordance with data transferred from the client (for example, registration of data into a database), and transfers information obtained as the result of the processing to the client. Further, the request may include specifying specific software such as WordPress® or a file included in the software (for example, wordpress, wp-cron, or wp-content). The WEB server 3 having received this type of request executes the corresponding software or file, and transfers information obtained as the result to the client.

The WAF server 2 is a firewall device that prevents an unauthorized access from an external network to the WEB server 3 by managing transmission and reception at an application level. While the WAF server 2 is generally provided in a physically different computer from the WEB server 3, the WAF server 2 can be provided in the same computer as the WEB server 3.

Upon reception of a request from a client, each WEB server 3 once transfers the request to the WAF server 2. The WAF server 2 stores therein a rule for distinguishing a request to be blocked and a request to be permitted from each other (specifically, a signature in which requests to be blocked are listed) for each WEB server 3. The WAF server 2 matches the transferred request with this rule to determine whether to block or permit the request, and returns the determination result to the WEB server 3. When it has been determined that the request is to be blocked, the WEB server 3 discards the request. When it has been determined that the request is to be permitted, the WEB server 3 provides services corresponding to the request to the client.

Further, the WAF server 2 is configured to regularly update the contents of a rule stored for each WEB server 3 by regularly operating respective functional units illustrated in FIG. 2B described later. Although the specific contents of this process are described later, automatic selection of a rule required for each individual WEB server 3 is realized by performing this process.

Figure 1B:
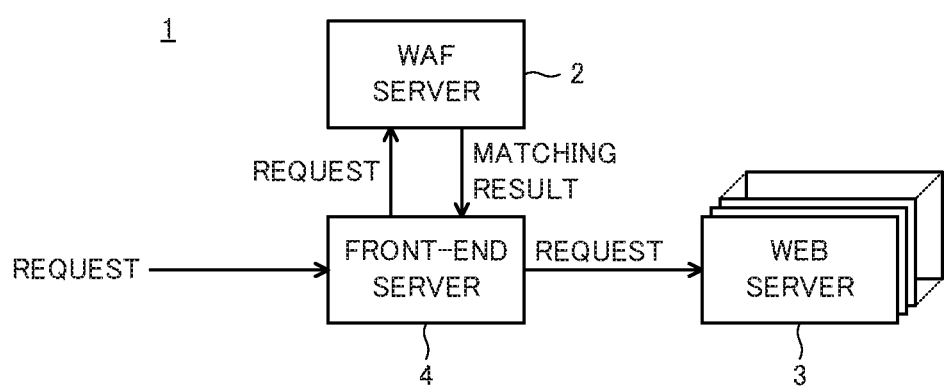
FIG. 1B is a diagram illustrating another example of the system configuration of the firewall system 1 according to the embodiment of the present invention.

FIG. 1B is a diagram illustrating another example of the system configuration of the firewall system 1 according to the embodiment of the present invention. The difference between the configuration illustrated in FIG. 1B and the configuration illustrated in FIG. 1A is that a front-end server 4 is provided. The front-end server 4 receives a request from a client in place of the WEB server 3, and once transfers the request to the WAF server 2. Subsequently, when the WAF server 2 has determined that the request is to be blocked, the front-end server 4 discards the request without transferring it to the WEB server 3. When the WAF server 2 has determined that the request is to be permitted, the front-end server 4 transfers the request to the WEB server 3. The present invention can be applied not only to the WAF server 2 in the configuration in FIG. 1A but also to the WAF server 2 in the configuration in FIG. 1B in the same way.

Figure 2A:
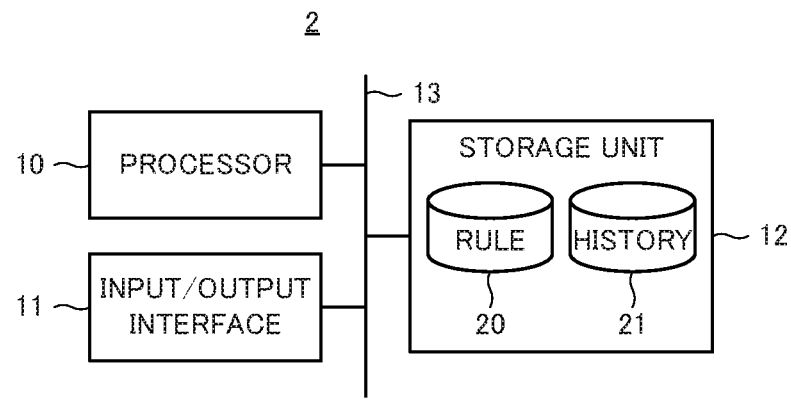
FIG. 2A is a diagram illustrating a hardware configuration of the WAF server 2.
Figure 2B:
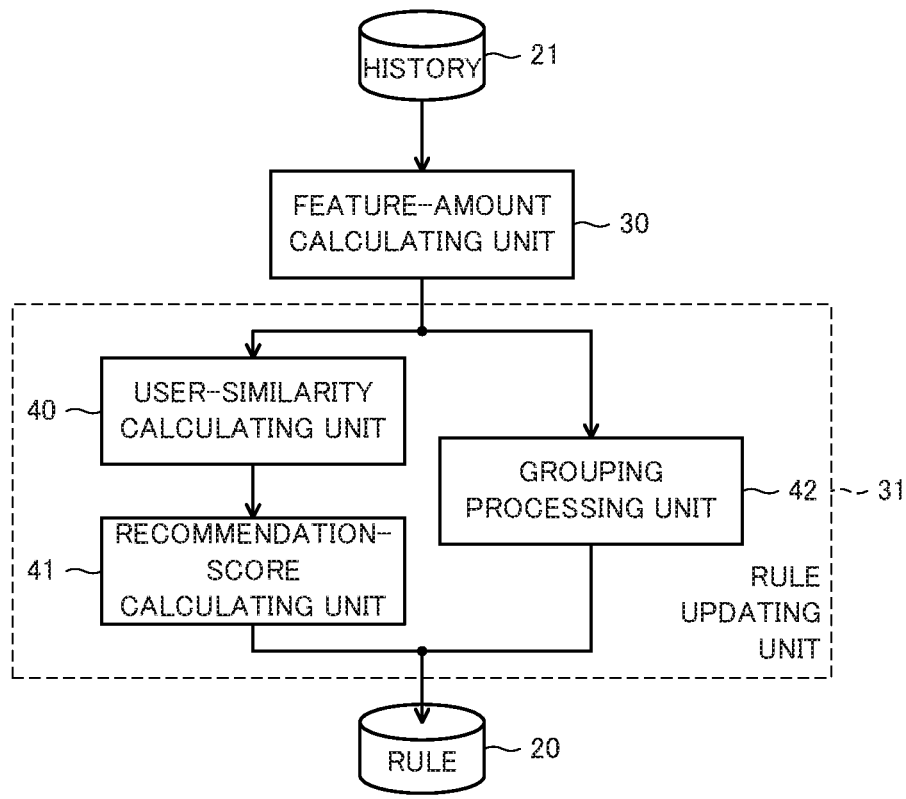
FIG. 2B is a schematic block diagram illustrating functional blocks of the WAF server 2.

FIG. 2A is a diagram illustrating a hardware configuration of the WAF server 2, and FIG. 2B is a schematic block diagram illustrating functional blocks of the WAF server 2.

As illustrated in FIG. 2A, the WAF server 2 is configured to include a processor 10, an input/output interface 11, and a storage unit 12 that are mutually connected to each other via a bus 13. The processor 10 is a processing device that performs processing in accordance with a program stored in an internal main memory (not illustrated). Each function of the WAF server 2 described later is realized by processing performed by the processor 10. The input/output interface 11 is configured to include input means for receiving input from a user such as a mouse or a keyboard, output means for performing output to the user such as a display or a speaker, and communication means for communicating with other computers including each WEB server 3. The storage unit 12 is an auxiliary storage device such as a hard disk drive. A rule database 20 and a history database 21 that are described later are established in the storage unit 12.

Functionally, the WAF server 2 is configured to include the rule database 20, the history database 21, a feature-amount calculating unit 30, and a rule updating unit 31, as illustrated in FIG. 2B. Further, the rule updating unit 31 is configured to include therein a user-similarity calculating unit 40, a recommendation-score calculating unit 41, and a grouping processing unit 42.

The rule database 20 is a database that stores therein one or more rules related to blocking of a request for each of the WEB servers 3. The rule for each WEB server 3 is stored in the rule database 20 independently of the rule for another WEB server 3. The rule stored in the rule database 20 forms a so-called "black list". Therefore, the WAF server 2 determines that a request transferred from the WEB server 3 or the front-end server 4 is to be blocked when the request is stored in the rule database 20, and determines that the request is to be permitted when the request is not stored in the rule database 20.

The history database 21 is a database that stores therein a request log (an access log) for each of the WEB servers 3. The access log includes an IP address of a request source, a reception time of the request, a type of HTTP method (GET, POST, and the like), a URI of an accessed file (including a file name and an identifier), information of a device that has transmitted the request (such as an OS or a browser type), and information indicating a processing method of the request (blocking or permitting). The information indicating a processing method includes information indicating a rule used as the basis for blocking or permitting.

The feature-amount calculating unit 30 is a functional unit that calculates a feature amount for each of the WEB servers 3 based on the number of detections with regard to each index in each of the WEB servers 3. The index is, for example, a rule stored in the rule database 20 or a request type stored in the history database 21. The request type includes, for example, an HTTP method (GET, POST, and the like), an access destination process that is determined from a URI of an accessed file (logic, wordpress, wp-cron, wp-content, and the like), and an identifier included in the URI of the accessed file (php, css, js, gif, jpg, png, txt, html, and the like). The request type can be configured by grouping a portion of these items. In the following descriptions, access destination processes "wordpress", "wp-cron", and "wp-content" are used as one request type "wordpress", and identifiers "gif", "jpg", and "png" are used as one request type "image".

Figure 3:
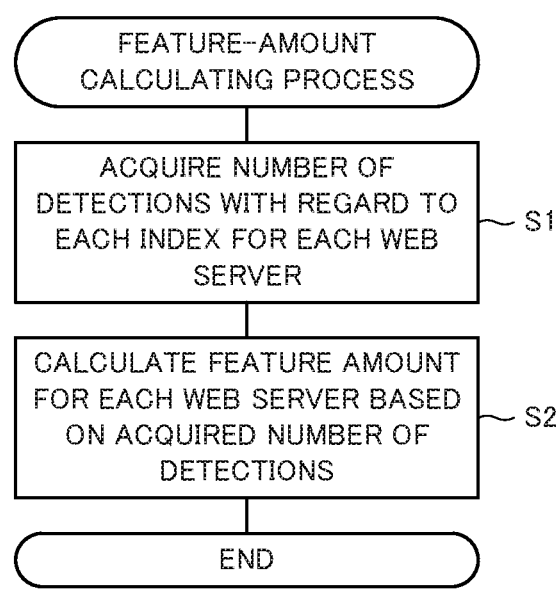
FIG. 3 is a process flowchart of a feature-amount calculating process performed by the feature-amount calculating unit 30 shown in FIG. 2B.

FIG. 3 is a process flowchart of a feature-amount calculating process performed by the feature-amount calculating unit 30. As illustrated in FIG. 3, the feature-amount calculating unit 30 first acquires the number of detections with regard to each index for each of the WEB servers 3 (Step S1). The feature-amount calculating unit 30 then calculates a feature amount for each of the WEB servers 3 based on the number of detections with regard to each index in each of the WEB servers 3 (Step S2). In the following descriptions, a case where the index is a rule and a case where the index is a request type are specifically described.

First, the case where the index is a rule is described. FIG. 7 is a diagram illustrating an example of the number of detections that is acquired when the index is a rule. A WEB server ID illustrated in FIG. 7 is information for identifying each individual WEB server 3, and a rule ID is information for identifying each individual rule. In the following descriptions, a WEB server 3 and a rule may be specified only by a description of a WEB server ID and that of a rule ID, respectively. The feature-amount calculating unit 30 reads an access log for each WEB server 3 from the history database 21, and adds up the number of blocked requests included in the access log for each corresponding rule. In this manner, as illustrated in FIG. 7, the feature-amount calculating unit 30 acquires the number of detections with regard to each rule in each WEB server 3.

FIGS. 8A and 8B illustrate a calculation example of a feature amount in a case where the index is a rule. FIG. 8A is a diagram illustrating calculation of a feature amount for host000039, and FIG. 8B is a diagram illustrating calculation of a feature amount for host000041. As illustrated in FIGS. 8A and 8B, the feature-amount calculating unit 30 calculates a ratio of the number of detections of each individual unauthorized access to the total number of detections for each WEB server 3, and further calculates a value obtained by subtracting the calculated ratio from 1 as a feature amount with regard to each rule. These calculations are represented by the following expressions (1) and (2). The feature amount for each WEB server 3 is represented by a set of feature amounts including a feature amount with regard to each rule calculated for the target WEB server 3 and a feature amount with regard to an undetected rule (=0).

$$\text{Ratio} = \text{number of detections/total number of detections} \quad (1)$$

$$\text{Feature amount with regard to rule} = 1 - \text{ratio} \quad (2)$$

FIG. 9 is a diagram illustrating a feature-amount matrix created by using a rule as an index. The feature-amount calculating unit 30 is configured to hold feature amounts (a set of feature amounts with regard to respective rules) for each WEB server 3 calculated in the manner described above in a matrix as illustrated in FIG. 9.

Next, the case where the index is a request type is described. FIG. 12B is a diagram illustrating an example of the number of detections acquired in the case where the index is a request type. FIG. 12B and FIGS. 12A and 12C described later illustrate data created in accordance with a format of data exchanged between various types of programming languages such as, e.g., JavaScript® Object Notation (JSON). The feature-amount calculating unit 30 reads an access log for each WEB server 3 from the history database 21, and adds up the number of requests included in the access log for each request type. In this manner, as illustrated in FIG. 12B, the feature-amount calculating unit 30 acquires the number of detections for each request type in each WEB server 3.

FIG. 12A illustrates a state before a portion of request types are grouped by the feature-amount calculating unit 30. As is understood from comparison between FIGS. 12A and 12B, a request type "wordpress" in FIG. 12B corresponds to a group of three request types "wordpress", "wp-cron", and "wp-content" illustrated with A1 in FIG. 12A. A request type "image" in FIG. 12B corresponds to a group of three request types "gif", "jpg", and "png" illustrated with A2 in FIG. 12A. The feature-amount calculating unit 30 assumes a plurality of request types forming a group (for example, the request types "wordpress", "wp-cron", and "wp-content") as the same request type (for example, the request type "wordpress"), and performs the addition described above.

FIG. 12C is a diagram illustrating a calculation example of a feature amount in a case where the index is a request type. As illustrated in FIG. 12C, the feature-amount calculating unit 30 classifies request types into a plurality of classifications B1 and B2 in accordance with the contents thereof, and calculates a ratio of the number of detections of each individual request type to the total number of detections by the above expression (1) as a feature amount with regard to each request type for each WEB server 3 and for each classification. The feature amount for each WEB server 3 is represented by a set of feature amounts including the feature amounts with regard to the respective request types calculated for the WEB server 3 and a feature amount with regard to an undetected request type (=0).

FIG. 13 is a diagram illustrating an example of a feature-amount matrix created by using a request type as an index. The feature-amount calculating unit 30 is configured to hold feature amounts for each WEB server 3 calculated in the manner described above (a set of feature amounts with regard to respective request types) in a matrix as illustrated in FIG. 13.

Referring back to FIG. 2B, the rule updating unit 31 is a functional unit that updates a rule stored in the rule database 20 for each of the WEB servers 3 based on the feature amount calculated by the feature-amount calculating unit 30. Specific processes of the rule updating unit 31 are performed by using the user-similarity calculating unit 40 and the recommendation-score calculating unit 41 for a feature-amount matrix created by using a rule as an index, and are performed by the grouping processing unit 42 for a feature-amount matrix created by using a request type as an index. Each of the processes is described below in detail.

The user-similarity calculating unit 40 is a functional unit that calculates a user similarity indicating a mutual similarity among the WEB servers 3 based on the feature amounts calculated by the feature-amount calculating unit 30.

Figure 4:
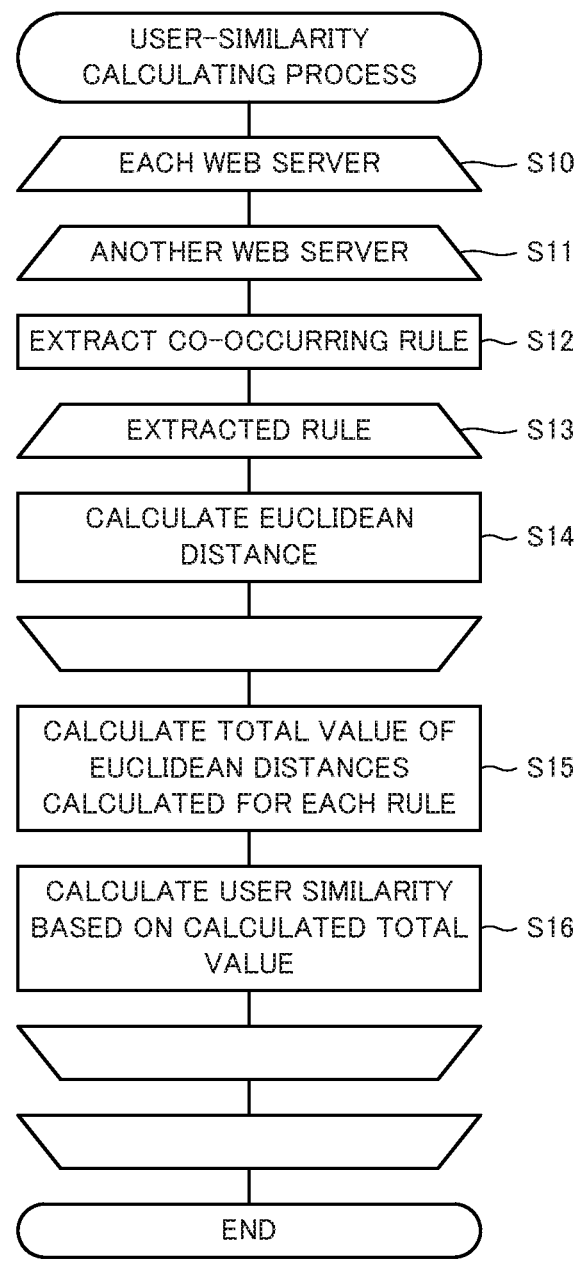
FIG. 4 is a process flowchart of a user-similarity calculating process performed by the user-similarity calculating unit 40 shown in FIG. 2B.

FIG. 4 is a process flowchart of a user-similarity calculating process performed by the user-similarity calculating unit 40. As illustrated in FIG. 4, the user-similarity calculating unit 40 calculates a user similarity by performing processes at Steps S12 to S16 for all combinations of the WEB servers 3 (Steps S10 and S11).

Specifically, the user-similarity calculating unit 40 first extracts a rule co-occurring for two target WEB servers 3 from a feature-amount matrix (Step S12). Co-occurring described here means that the number of detections is larger than zero in both WEB servers 3.

FIG. 10A is a diagram illustrating rules each co-occurring between host000039 and host000041. In this example, four rules (rule IDs: 31151, 31508, 31515, and 31516) are co-occurring. A numerical value at an intersection of a WEB server ID and a rule ID in FIG. 10A represents a feature amount included in a feature-amount matrix. A portion of these values are also illustrated in FIG. 9.

Referring back to FIG. 4, the user-similarity calculating unit 40 calculates a Euclidean distance with regard to each of the extracted rules (Steps S13 and S14). Specifically, calculation of a Euclidean distance is performed with the following expression (3).

$$\text{Euclidean distance} = (\text{feature amount for one WEB server 3} - \text{feature amount for the other WEB server})^2 \quad (3)$$

FIG. 10B is a diagram illustrating a Euclidean distance with regard to each rule calculated in the example illustrated in FIG. 10A. As illustrated in FIG. 10B, a Euclidean distance is calculated with regard to each rule.

Referring back to FIG. 4, the user-similarity calculating unit 40 then calculates a total value of the Euclidean distances calculated for the respective rules (Step S15) and calculates a user similarity based on the calculated total value (Step S16). Specifically, calculation at Step S16 is performed with the following expression (4). A user similarity obtained by this calculation indicates that, as the user similarity is larger, a difference between feature amounts is smaller. Therefore, a larger user similarity indicates that situations of attacks are more similar.

$$\text{User similarity} = 1/(1+\text{total value}^{0.5}) \quad (4)$$

FIG. 10C is a diagram illustrating a total value of Euclidean distances and a user similarity calculated in the example illustrated in FIG. 10A. In FIG. 10C, the total value of Euclidean distances is a value obtained by totaling the Euclidean distances illustrated in FIG. 10B, and the user similarity is a value obtained by substituting the total value of Euclidean distances into the expression (4).

Referring back to FIG. 2B, the recommendation-score calculating unit 41 is a functional unit that calculates a recommendation score for each of the WEB servers 3 with regard to each of one or more rules that are not stored in the rule database 20 for the target WEB server 3 but are stored in the rule database 20 for another WEB server 3. The recommendation score is a weighted average of feature amounts weighted with the user similarities calculated by the user-similarity calculating unit 40.

Figure 5:
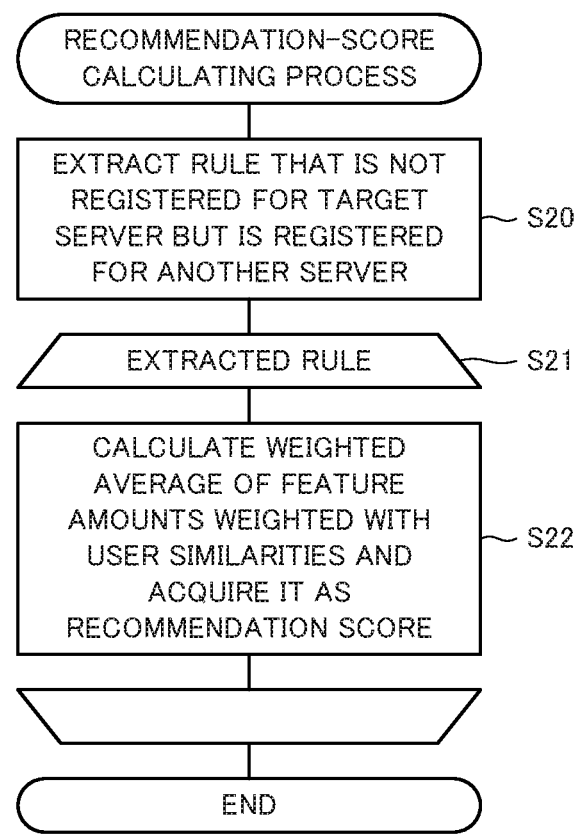
FIG. 5 is a process flowchart of a recommendation-score calculating process performed by the recommendation-score calculating unit 41 shown in FIG. 2B.

FIG. 5 is a process flowchart of a recommendation-score calculating process performed by the recommendation-score calculating unit 41. The process illustrated in FIG. 5 is a process performed by the recommendation-score calculating unit 41 for each WEB server 3. As illustrated in FIG. 5, the recommendation-score calculating unit 41 extracts a rule that is not registered (that is, not stored in the rule database 20) for a target WEB server 3 but is registered (that is, stored in the rule database 20) for another WEB server 3 (Step S20). The recommendation-score calculating unit 41 then performs a process at Step S22 for each extracted rule (Step S21).

At Step S22, the recommendation-score calculating unit 41 calculates a weighted average of feature amounts (calculated by the feature-amount calculating unit 30) with user similarities calculated by the user-similarity calculating unit 40, and sets the calculated weighted average as a recommendation score that indicates a degree of recommendation to the target WEB server 3. Specifically, calculation of a recommendation score is performed with the following expression (5). However, a "registration status" is 1 for a WEB server 3 for which the rule is registered, and is 0 for a WEB server 3 for which the rule is not registered. The recommendation score obtained by this calculation has a value indicating that, as the value is larger, a corresponding rule is more frequently used for another WEB server 3 for which a situation of attack is similar.

$$\text{Recommendation score} = \Sigma(\text{feature amount} \times \text{user similarity}) / \Sigma(\text{registration status} \times \text{user similarity}) \quad (5)$$

FIG. 11A is a diagram illustrating one or more rules that are not registered for host000039 but are registered for another WEB server 3. This example illustrates a case where such rules are stored only for two WEB servers 3, host000042 and host000049 for simplicity. As illustrated in FIG. 11A, in this example, five unregistered rules "31103", "31510", "31511", "31533", and "200002" are registered for host000042, and three unregistered rules "31103", "31153", and "31533" are registered for host000049.

FIG. 11B is a diagram illustrating a feature amount for each WEB server 3 illustrated in FIG. 11A. The feature amount illustrated in FIG. 11B is included in the feature-amount matrix illustrated in FIG. 9. However, FIG. 11B only illustrates a portion related to the rules listed in FIG. 11A which is extracted from the feature amounts described in the feature-amount matrix.

FIG. 11C is a diagram illustrating a recommendation score calculated by the above expression (5) with regard to each rule ID illustrated in FIG. 11B. In this manner, the recommendation-score calculating unit 41 calculates a recommendation score with regard to each unregistered rule.

Referring back to FIG. 2B, the rule updating unit 31 updates a rule stored in the rule database 20 for each of the WEB servers 3 based on the recommendation score calculated by the recommendation-score calculating unit 41. In this case, a way of referring to the recommendation score is optional. For example, a rule for which a recommendation score is a predetermined value or more can be added, rules corresponding to recommendation scores within a predetermined number from the largest recommendation score can be added, or a rule for which a deviation value of a recommendation score is a predetermined value or more can be added. As described above, a larger recommendation score means that a corresponding rule is more frequently used in another WEB server 3 for which a situation of attack is similar. Therefore, by updating a rule by this method, it is possible to appropriately select a rule required for each individual WEB server 3.

In the example of FIGS. 11A to 11C, when a rule for which a recommendation score is within three from the largest recommendation score is added, for example, the rule updating unit 31 newly registers three rules corresponding to rule IDs "31153", "200002", and "31510" into the rule database 20 for host000039.

Referring back to FIG. 2B, the grouping processing unit 42 is a functional unit that groups the WEB servers 3 based on the feature amounts calculated by the feature-amount calculating unit 30.

Figure 6:
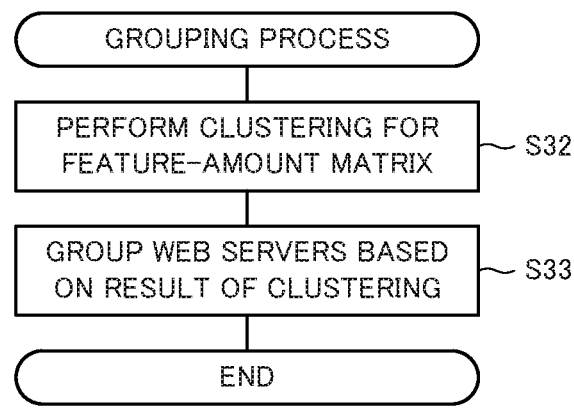
FIG. 6 is a process flowchart of a grouping process performed by the grouping processing unit 42 shown in FIG. 2B.

FIG. 6 is a process flowchart of a grouping process performed by the grouping processing unit 42. As illustrated in FIG. 6, first, the grouping processing unit 42 performs clustering for a feature-amount matrix (Step S32), and then groups the WEB servers 3 based on the clustering result (Step S33). As a specific clustering algorithm, it is possible to use various algorithms. For example, it is preferable to use DBSCAN (Density-based spatial clustering of applications with noise). By using DBSCAN, it is possible to group the WEB servers 3 based on the closeness between the feature amounts thereof.

Figure 15:
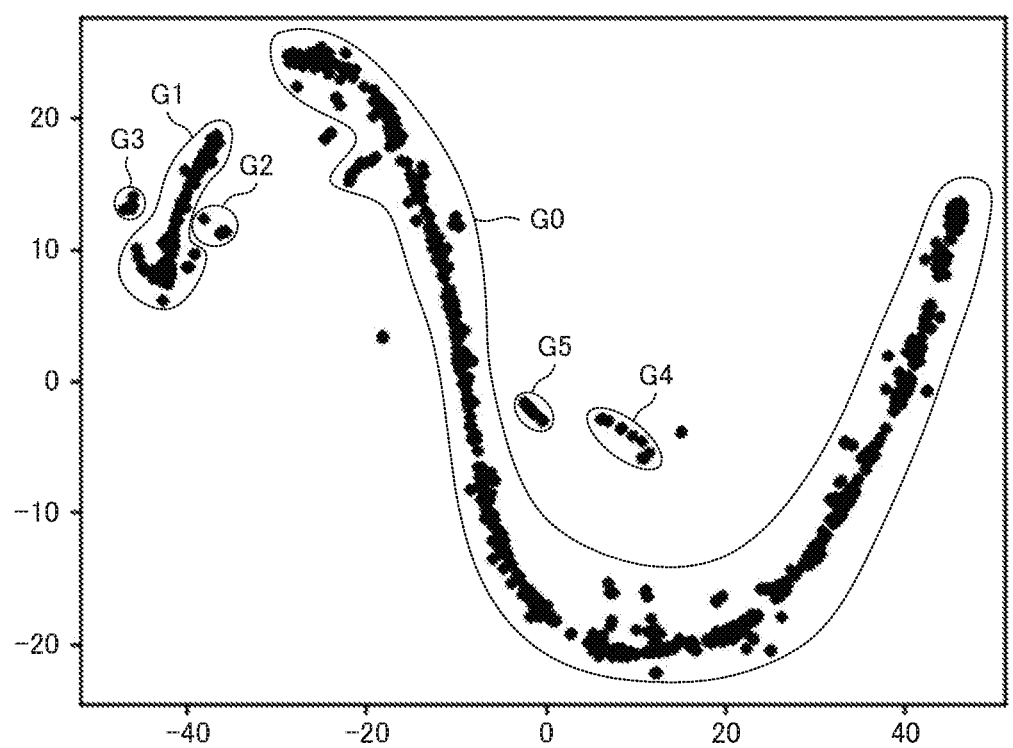
FIG. 15 is a diagram illustrating an output result of DBSCAN.

FIG. 14 is a diagram illustrating an example of grouping of a plurality of WEB servers 3 by clustering. FIG. 15 is a diagram illustrating an output result of DBSCAN. Groups G0 to G2 illustrated in FIG. 14 respectively correspond to groups G0 to G2 illustrated in FIG. 15. FIG. 15 further illustrates groups G3 to G5.

Black circles in FIG. 15 each represent a WEB server 3. By using clustering in this manner, the WEB servers 3 can be grouped based on the closeness between the feature amounts. Because this feature amount is calculated by using a request type as an index as described above, it can be said that the WEB servers 3 assigned to the same group are similar to each other in a request status.

Referring back to FIG. 2B, the rule updating unit 31 makes a rule stored in the rule database 20 for one or more WEB servers 3 classified in the same group by the grouping processing unit 42 common to one another, thereby updating a rule stored in the rule database 20 for each of the WEB servers 3. It is considered the WEB servers 3 that are similar to each other in a request status are also similar in a required rule. Therefore, update of a rule in accordance with this method enables appropriate selection of a rule required for each individual WEB server 3.

As described above, according to the WAF server 2 of the present embodiment, it is possible to automatically select a rule required for each individual WEB server 3 based on the number of detections with regard to each index in each of the WEB servers 3. Therefore, it is possible to quickly deal with a new type of attack without making the size of rules very large.

Particularly, in a case of using a rule as an index, a recommendation score on which a status of use of each rule in another WEB server 3 that is similar in a situation of attack is reflected is calculated, and a rule is updated based on this recommendation score. Therefore, it is possible to appropriately select a rule required for each individual WEB server 3.

Further, in a case of using a request type as an index, a rule is updated by grouping WEB servers 3 that are similar to each other in a request status by clustering, and making a rule common to one another in a group. Therefore, also in this case, it is possible to appropriately select a rule required for each individual WEB server 3. In addition, a rule can be updated irrespective of an actual situation of attack. Therefore, it is possible to appropriately update a rule for a WEB server 3 that is not attacked very often.

While a preferred embodiment of the present invention has been described above, the present invention is not limited in any way to the embodiment described above, and it is needless to mention that the present invention can be implemented with variously modified embodiments without departing from the scope of the invention.

For example, the WAF server 2 can store the WEB servers 3 that have been already grouped, and can perform the processes described above within a group only. In this case, it is possible to prevent a rule-update status from spreading beyond the framework of a company or an organization.

Further, although FIG. 2A illustrates an example in which the WAF server 2 is configured by a single computer, the WAF server 2 can be configured by a set of a plurality of computers. This also applies to the WEB servers 3 and the front-end server 4.

What is claimed is:

1. A method of operating a firewall device, the method comprising:
   storing one or more rules related to blocking a request for each server of a plurality of WEB servers independently of a rule for another WEB server, each server of the plurality of WEB servers having a respective index;
   calculating a feature amount for each server of the plurality of WEB servers based on a cumulative number of detections with regard to each index for each server of the plurality of WEB servers; and
   updating a rule stored based on the feature amount calculated by the calculating of the feature amount for each server of the plurality of WEB servers, the updating comprising:
   calculating a user similarity indicating a mutual similarity between the WEB servers based on the feature amounts calculated by the calculating of the feature amount;
   calculating, for each WEB server, a recommendation score with regard to each rule of the one or more rules that are not stored for a corresponding WEB server but are stored for another WEB server, the recommendation score being a weighted average of the feature amounts weighted with the user similarities calculated by the calculating of the user similarity; and
   updating the rule stored for each of the WEB servers based on the recommendation score calculated by the calculating of the recommendation score.

2. A firewall device comprising:
   a storage that stores therein one or more rules related to blocking a request for each server of a plurality of WEB servers independently of a rule for another WEB server, each server of the plurality of WEB servers having a respective index; and
   a processor and a memory that stores an instruction, wherein upon execution of the instruction, the processor operates as:
   a feature-amount calculator that calculates a feature amount for each server of the plurality of WEB servers based on a number of detections with regard to each index for each server of the plurality of WEB servers; and a rule updater that updates a rule stored in the storage based on the feature amount calculated by the feature-amount calculator for each server of the plurality of WEB servers, wherein the rule updater includes:
- a user-similarity calculator that calculates a user similarity indicating a mutual similarity between the WEB servers based on the feature amounts calculated by the feature-amount calculator; and
- a recommendation-score calculator that calculates, for each WEB server, a recommendation score with regard to each rule of the one or more rules that are not stored in the storage for a corresponding WEB server but are stored in the storage for another WEB server, the recommendation score being a weighted average of the feature amounts weighted with the user similarities calculated by the user-similarity calculator, and the rule updater updates the rule stored in the storage for each of the WEB servers based on the recommendation score calculated by the recommendation-score calculator.

3. The firewall device as claimed in claim 2, wherein the index is a type of the request.

4. The firewall device as claimed in claim 3, wherein
the rule updater includes a grouping processor that groups one or more WEB servers of the plurality of WEB servers to form a WEB server group based on the feature amounts calculated by the feature-amount calculator, and the rule updater updates the rule stored in the storage for each WEB server of the WEB server group by making a rule stored in the storage for one or more WEB servers classified into the WEB server group by the grouping processor, common to every WEB server in the WEB server group.

5. The firewall device as claimed in claim 2, wherein
the plurality of WEB servers includes a target WEB server, and the rule updater adds one or more rules that are not stored in the storage for the target WEB server but are stored in the storage for another WEB server as one or more rules for the target WEB server to the storage.

6. The firewall device as claimed in claim 2, wherein the index is the rule.

* * * * *